(12) United States Patent
Ruth et al.

(10) Patent No.: US 9,556,779 B2
(45) Date of Patent: Jan. 31, 2017

(54) LEAK DETECTION AND MITIGATION IN REDUCTANT DELIVERY SYSTEMS

(71) Applicant: Cummins Inc., Columbus, IN (US)

(72) Inventors: Michael J. Ruth, Franklin, IN (US); Cary Henry, Helotes, TX (US)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/482,547

(22) Filed: Sep. 10, 2014

(65) Prior Publication Data

US 2015/0113960 A1 Apr. 30, 2015

Related U.S. Application Data

(60) Provisional application No. 61/895,835, filed on Oct. 25, 2013.

(51) Int. Cl.
| | | |
|---|---|---|
| *F01N 3/00* | (2006.01) | |
| *F01N 11/00* | (2006.01) | |
| *F01N 3/20* | (2006.01) | |
| *F02M 65/00* | (2006.01) | |

(52) U.S. Cl.
CPC .............. *F01N 11/00* (2013.01); *F01N 3/206* (2013.01); *F01N 3/208* (2013.01); *F01N 2550/05* (2013.01); *F01N 2610/105* (2013.01); *F01N 2610/12* (2013.01); *F01N 2900/0412* (2013.01); *F01N 2900/1621* (2013.01); *F01N 2900/1808* (2013.01); *F01N 2900/1811* (2013.01); *F01N 2900/1812* (2013.01); *F02M 65/006* (2013.01); *Y02T 10/24* (2013.01); *Y02T 10/47* (2013.01); *Y10T 137/0318* (2015.04)

(58) Field of Classification Search
USPC ......... 60/274, 276, 277, 286, 295, 297, 301, 60/303
See application file for complete search history.

(56) References Cited

U.S. PATENT DOCUMENTS

| | | | |
|---|---|---|---|
| 5,322,797 A | 6/1994 | Mallow et al. | |
| 6,070,454 A | 6/2000 | Cavestri | |
| 6,266,955 B1* | 7/2001 | Liang | F01N 3/2066 123/1 A |
| 6,546,720 B2* | 4/2003 | van Nieuwstadt | B01D 53/90 60/274 |
| 6,886,389 B1 | 5/2005 | Hagar | |
| 7,500,355 B2* | 3/2009 | Masuda | F01N 3/103 60/277 |
| 7,644,579 B2* | 1/2010 | Roberts | B01D 53/9431 60/274 |
| 8,161,735 B2* | 4/2012 | Kitazawa | F01N 3/2066 60/295 |
| 8,491,842 B2* | 7/2013 | Johansen | C01C 1/006 206/0.7 |
| 8,820,058 B2* | 9/2014 | Henry | F01N 3/208 60/274 |
| 8,857,153 B2* | 10/2014 | Yacoub | F01N 3/208 60/274 |
| 8,869,514 B2* | 10/2014 | Pietraszek | B01D 53/90 60/274 |

(Continued)

*Primary Examiner* — Binh Q Tran
(74) *Attorney, Agent, or Firm* — Taft Stettinius & Hollister LLP

(57) ABSTRACT

Solid storage media stores a reductant in a reductant source that is released from the solid storage media in a gaseous form into an exhaust system. A leak detection and/or leak mitigation system, method and apparatus is disclosed for the gaseous reductant.

20 Claims, 5 Drawing Sheets

(56) References Cited

U.S. PATENT DOCUMENTS

| | | | |
|---|---|---|---|
| 8,915,062 B2* | 12/2014 | Wang | F01N 3/208 60/274 |
| 9,010,087 B1* | 4/2015 | Upadhyay | F01N 3/208 60/274 |
| 2010/0172816 A1 | 7/2010 | Mayer et al. | |

* cited by examiner

LEAK DETECTION AND MITIGATION IN REDUCTANT DELIVERY SYSTEMS

CROSS-REFERENCE TO RELATED APPLICATION

The present application claims the benefit of the filing date of U.S. Provisional Application Ser. No. 61/895,835 filed on Oct. 25, 2013, which is incorporated herein by reference in its entirety.

TECHNICAL FIELD

The technical field generally relates to leak detection and/or leak mitigation during reductant delivery from a solid media storage system to an exhaust aftertreatment system for an internal combustion engine.

BACKGROUND

Solid storage media systems have been developed for ammonia storage in reductant delivery systems for selective catalytic reduction (SCR). The solid storage media systems typically provide a source of ammonia that is released as needed and delivered to an exhaust gas to treat emissions in an SCR aftertreatment system.

Ammonia provide certain advantages over a urea based system for SCR aftertreatment systems. Ammonia can be delivered successfully at much lower exhaust temperatures, without requiring temperature sufficient to rapidly evaporate and break down the urea. Additionally, the time delay between ammonia injection and available reductant at the SCR catalyst is minimal, making the dynamics and control of the system simpler and more stable. An example ammonia delivery system includes a solid medium storing the ammonia, and a release mechanism for the ammonia, for example through desorption from a medium and/or through a chemical reaction releasing ammonia as a product.

Ammonia delivery systems require the handling and management of gas phase fluids in the ammonia delivery system. Leakage of ammonia gas or other reductants into the environment is desired to be avoided. Therefore, technological developments in the detection and mitigation of gaseous reductant leaks are desirable in this area.

SUMMARY

Embodiments includes unique reductant leak detection and/or reductant leak mitigation systems, methods and apparatus for use in reductant delivery systems that store reductant in a solid storage media and release reductant from the solid storage media in gaseous form for delivery to an exhaust system. Other embodiments include unique methods, systems, and apparatus to determine and/or mitigate leakage of gaseous reductant between a solid storage media which stores and releases the gaseous reductant and an exhaust system which receives the gaseous reductant. The exhaust system can include an aftertreatment system such as an NOx reduction catalyst that is connected to receive exhaust from an internal combustion engine and operable to reduce NOx emissions.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The description herein makes reference to the accompanying drawings wherein like reference numerals refer to like parts throughout the several views, and wherein.

DESCRIPTION OF ILLUSTRATIVE EMBODIMENTS

Figure 1:
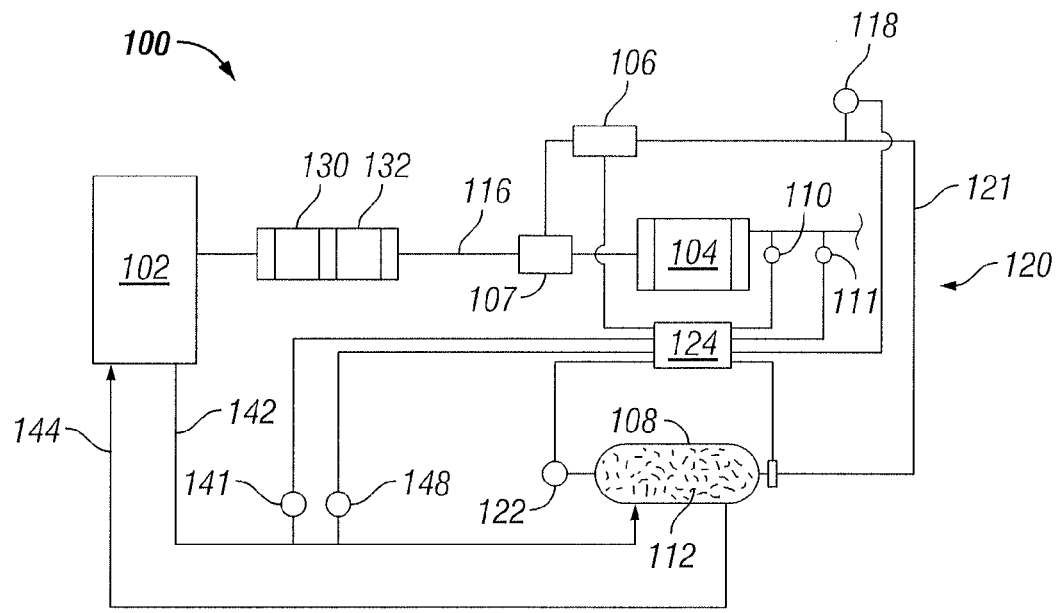
FIG. 1 is a schematic diagram of one embodiment system for leak detection and mitigation of gaseous reductant released from a NOx reductant solid storage media in an internal combustion engine exhaust aftertreatment system.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
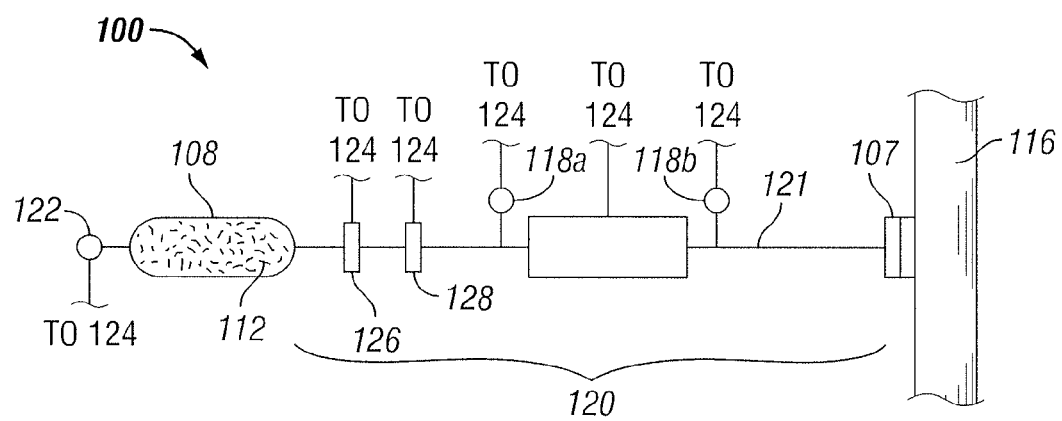
FIG. 2 is a schematic diagram of a further embodiment system for leak detection and mitigation of gaseous reductant released from a NOx reductant solid storage media.

FIGS. 1 and 2 are schematic diagrams of a system 100 for detecting and mitigating leakage of a gaseous NOx reductant released from a solid storage media. The system 100 includes an internal combustion engine 102 producing an exhaust gas stream into exhaust flow path 116, where the exhaust gas stream is emitted from engine 102. In one specific embodiment, engine 102 is a diesel engine. The exhaust output by engine 102 includes NOx and other components which are to be reduced using an exhaust aftertreatment system in exhaust flow path 116. System 100 is illustrated schematically and may be included with a car, truck, bus, boat, recreational vehicle, construction equipment or another type of vehicle. Other embodiments include an engine provided in non-vehicular applications such as a generator set.

The system 100 includes an aftertreatment system with a NOx conversion catalyst 104 in exhaust flow path 116 that reduces at least a portion of the amount of NOx from the exhaust stream, and a reductant source 108 that stores an amount of NOx reductant 112 such as, for example, ammonia ($NH_3$), in a solid storage media. In one embodiment, the solid storage media may be any material involving adsorption or absorption of molecular ammonia in the solid, or a solid chemical compound which can be manipulated in order to produce gaseous ammonia. In one particular embodiment, the solid storage media includes metal ammine salts. The NOx reductant stored in the solid storage media housed in reductant source 108 may be ammonia or any other reductant understood in the art capable of being stored and selectively released from a solid storage media. Reductant source 108 may include one or more storage units having one or more compartments for storing ammonia in solid storage media.

System 100 also includes a reductant delivery system 120 that receives gaseous reductant released from the solid storage media in reductant source 108, and provides the reductant 112 to the exhaust flow path 116 at a position upstream of the NOx conversion catalyst 104. Gaseous reductant passes through a reductant supply line 121 from reductant source 108 to a metering device 106 and from metering device 106 to a mixer 107 connected in fluid communication with exhaust flow path 116. The mixer 107 is located upstream of the NOx conversion catalyst 104. Mixer 107 is supplied with gaseous reductant from reductant source 108 and is operable to inject or otherwise mix reductant gas into exhaust flow path 116.

System 100 further includes a pressure sensor 118 in fluid communication with reductant supply line 121 and a temperature sensor 122 operatively connected to the solid storage media in reductant source 108. In one embodiment, such as shown in FIG. 2, a first pressure sensor 118$a$ is provided upstream of metering device 106 and a second pressure sensor 118$b$ is provided downstream of metering device 106. Pressure sensors 118, 118$a$, 118$b$ provide an indication or output of gaseous reductant pressure in supply line 121. The system 100 may also include at least one NOx sensor 110 and at least one temperature sensor 111 operably coupled to the exhaust flow path 116 at a position downstream of the NOx conversion catalyst 104. Additional temperature, pressure, mass flow, and other sensors in one or more components of the aftertreatment system are also contemplated and not precluded.

In one embodiment, the exhaust aftertreatment system may include an oxidation catalyst 130 which is in fluid communication with exhaust flow path 116 and is operable to catalyze oxidation of one or more compounds in exhaust flowing through exhaust flow path 116, for example, oxidation of unburned hydrocarbons or oxidation of NO to $NO_2$. Oxidation catalyst 130 can be any of various flow-through oxidation catalysts. Generally, oxidation catalyst 130 includes a substrate with an active catalyst layer configured to oxidize at least some particulate matter (e.g., the soluble organic fraction of soot) in the exhaust and reduce unburned hydrocarbons and CO in the exhaust to less environmentally harmful compounds. For example, in some implementations, the oxidation catalyst 130 may sufficiently reduce the hydrocarbon and CO concentrations in the exhaust to meet the requisite emissions standards.

The exhaust aftertreatment system may also include a diesel particulate filter 132 in fluid communication with exhaust flow path 116 and operable to reduce the level of particulates in exhaust flowing through exhaust flow path 116. In an exemplary embodiment diesel particulate filter 132 is a catalyzed soot filter. The diesel particulate filter 132 can be any of various particulate filters known in the art configured to reduce particulate matter concentrations, e.g., soot and ash, in the exhaust gas to meet requisite emission standards. The diesel particulate filter 132 includes a filter substrate that captures soot and other particulate matter generated by the engine 102. The system 100 periodically regenerates diesel particulate filter 132 to remove particulate matter that has accumulated on the diesel particulate filter over time. For example, diesel particulate filter 132 can be regenerated by increasing the temperature of the exhaust gas above a threshold temperature corresponding with combustion of the particulate matter.

In certain implementations, the system 100 includes an exhaust gas recirculation (EGR) line (not shown) configured to allow a portion of the exhaust gas generated by the engine to recirculate back into the engine for altering the combustion properties of the engine 102. The exhaust aftertreatment system may further include a hydrocarbon (FTC) injector (not shown) which is supplied with HC from an HC reservoir and is operationally coupled to the exhaust stream at a position upstream of $NO_x$ conversion catalyst 104. Other embodiments of system 100 may include engine 102 having a common rail fuel system capable of injecting a post injection fuel where at least a portion of the post injection fuel does not combust to provide HC in the exhaust stream. Embodiments are also contemplated without a HC injector. Certain embodiments may also include an ammonia oxidation AMOX catalyst (not shown) at a position downstream of the $NO_x$ conversion catalyst 104, which is operable to catalyze the reaction of $NH_3$ which slips past the $NO_x$ conversion catalyst 104.

Reductant gas injected into exhaust flow path 116 is provided to the $NO_x$ conversion catalyst 104 which is in flow communication with exhaust flow path 116 and is operable to catalyze the reduction of $NO_x$. $NO_x$ conversion catalyst 104 can be any of various catalysts known in the art. For example, in some implementations, the $NO_x$ conversion catalyst is an SCR catalyst with a zeolite based catalyst, such as a Cu-Zeolite or a Fe-Zeolite catalyst, or a vanadium based catalyst.

Reductant source 108 is operatively coupled with at least one engine coolant feed line 142 and an engine coolant return line 144. Feed line 142 provides a source of heat that heats the solid storage media stored in reductant source 108 to release the stored reductant in gaseous form. A coolant temperature sensor 141 and a coolant flow indicator 148 can be provided to indicate the temperature and flow rate of coolant to reductant source 108. Other embodiments contemplate other means for heating the solid storage media in reductant source 108, including, for example, an electrical heating element coupled to a power source such as a battery or generator. The heat source can be embedded in the solid storage media, or can extend around the outside of the solid storage media, or a combination of these arrangements. In one embodiment, heating of the solid storage material releases gaseous $NH_3$ from the solid storage media into supply line 121 by thermal desorption. The consumption rate of the released $NH_3$ gas is measured by metering device 106 as it is injected into exhaust flow path 116 upstream of the NOx conversion catalyst 104. Pressure sensor 118, or pressure sensors 118$a$, 118$b$, provide signals corresponding to the pressure of the gas released into supply line 121, while temperature sensor 122 simultaneously provides signals corresponding to the temperature of the solid storage media in reductant source 108. The temperature and pressure signals may be provided continuously or discretely.

Exhaust flow path 116, as illustrated schematically in FIG. 1, may be provided in a variety of physical configurations. In an exemplary embodiment an exhaust flow path proceeds from the output of a turbocharger (not shown) of engine 102 through a conduit to a structure containing oxidation catalyst 130 and diesel particulate filter 132, through a second conduit to a structure containing the NOx conversion catalyst 104 and through another conduit which outlets to the ambient environment. In other embodiments, the components of the exhaust gas after-treatment system can be positioned in any of various arrangements, and the system can include other components or fewer components. Generally, exhaust gas treated in the exhaust gas after-treatment system and released into the atmosphere consequently contains significantly fewer pollutants, such as diesel particulate matter, NOx, hydrocarbons, and carbon monoxide, than untreated exhaust gas.

The system 100 further includes a controller 124 that performs certain operations for detecting gaseous reductant leakage from delivery system 120 and for mitigating leakage when detected. In one embodiment, controller 124 is configured to detect leakage of gaseous reductant from the reductant delivery system 120 in response to a differential between actual operating conditions of the gaseous reductant 112 in the delivery system 120 and expected operating conditions of the gaseous reductant 112 in the delivery system 120 being more than a threshold amount. The controller 124 may include modules structured to functionally execute operations to determine gaseous reductant leakage and to mitigate gaseous reductant leakage. In certain embodiments, the controller 124 includes a solid storage media output module that evaluates and provides outputs regarding the actual and expected operating conditions of reductant released from the solid storage media in reductant source 108, and a leak detection module that evaluates the actual and expected operating conditions of the gaseous reductant to determine leakage of gaseous reductant from delivery system 120.

Controller 124 is connected to various sensors to receive or determine operating parameters of system 100 and to provide certain control outputs in response to the operating parameters according to programmed instructions. In the illustrated embodiment, controller 124 is connected to NOx sensor 110 and temperature sensor 111 to receive inputs regarding the operation of the exhaust system and the performance, such as NOx conversion efficiency, of the aftertreatment system. Additional sensors associated with the exhaust system can be provided and are not shown, such as additional NOx and/or temperature sensors at other locations, ammonia sensors, and flow sensors. Controller 124 is also connected to and receive inputs from pressure sensors 118, 118a, 118b, temperature sensor 122, and metering device 106 of delivery system 120. Controller 124 is also connected to and operable to control a shutoff valve 126 and a flow switch 128 of delivery system 120. Controller 124 is further connected to and receives inputs from temperature sensor 141 and coolant flow indicator 148 of the coolant supply line 142. Controller 124 may also be connected to and operable to control a control valve (not shown) to control the coolant flow through coolant supply line 142.

Controller 124 may include one or more modules structured to functionally execute the operations described herein. The description herein, including modules, emphasizes the structural independence of the aspects of the controller 124, and illustrates one grouping of operations and responsibilities of the controller 124. Other groupings that execute similar overall operations are understood within the scope of the present application. Modules may be implemented in hardware and/or instructions stored on a non-transient computer readable medium, and modules may be distributed across various hardware or instructions stored on non-transient computer readable medium.

Controller 124 forms a portion of a processing subsystem including one or more computing devices having memory as well as a number of inputs and outputs for interfacing with various sensors and subsystems of system 100. Controller 124 can include an electronic circuit comprised of one or more components, including digital circuitry, analog circuitry, or both. Controller 124 may be a single device or a distributed device. Controller 124 may include one or more control algorithms defined by operating logic in the form of software instructions, hardware instructions, firmware instructions, dedicated hardware, or the like.

In one form, controller 124 is of a programmable microcontroller solid-state integrated circuit type that includes memory and one or more central processing units. The memory of controller 124 includes of one or more components and can be of any of volatile or nonvolatile, solid-state, optical media, magnetic media, combinations of these, or other types of memory. Controller 124 can include signal conditioners, signal format converters (such as analog-to-digital and digital-to-analog converters), limiters, clamps, filters, and the like as needed to perform various control and regulation operations described herein. Controller 124, in an exemplary embodiment, may be a type of controller sometimes referred to as an electronic or engine control module (ECM), electronic or engine control unit (ECU) or the like, that is directed to the regulation and control of engine operation. Alternatively, controller 124 may be dedicated to the control of just the operations described herein or to a subset of controlled aspects of system 100.

Figure 3:
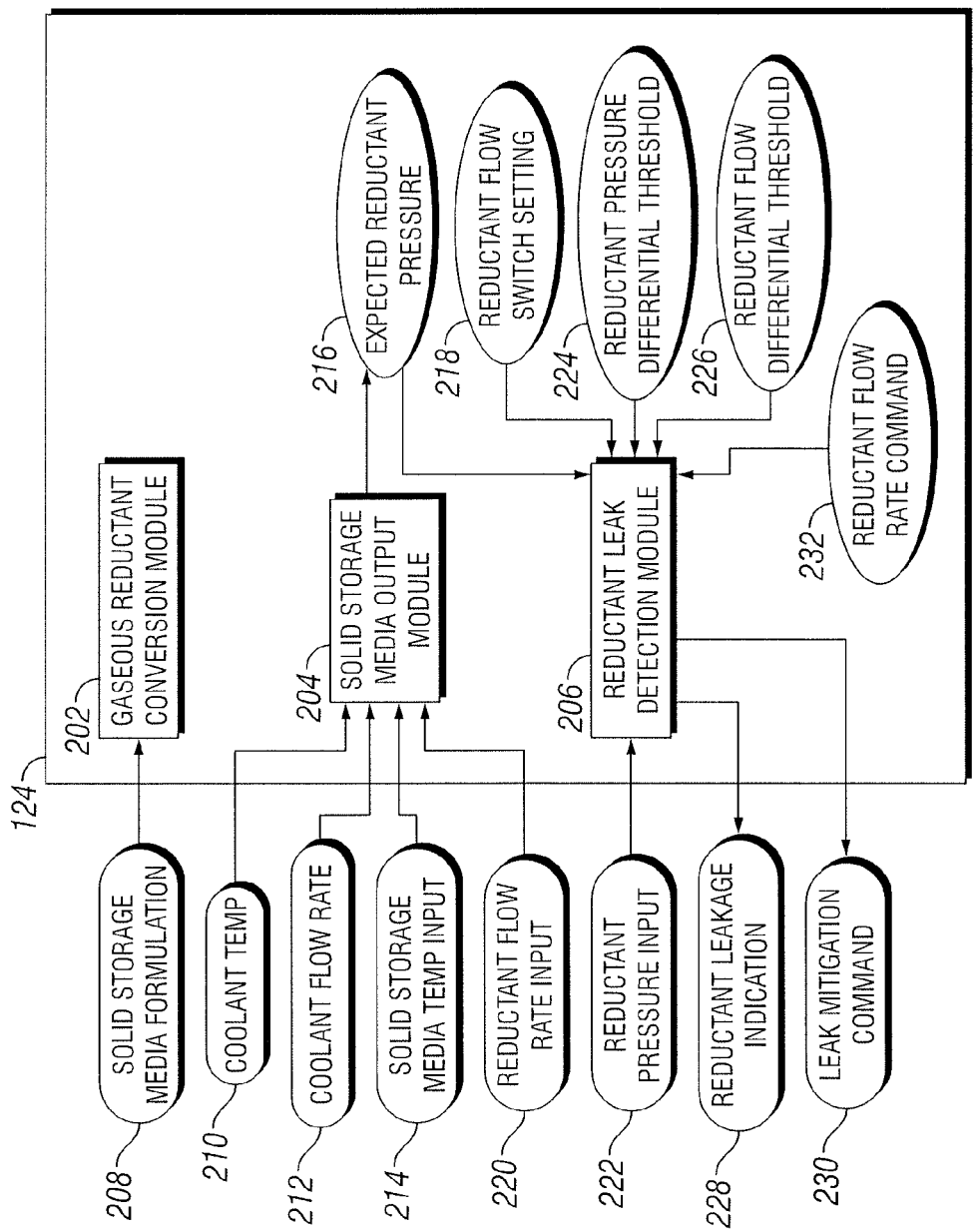
FIG. 3 is a schematic diagram of an apparatus for gaseous reductant leak detection and mitigation of gaseous reductant released from a NOx reductant solid storage media.

Referring to FIG. 3, an apparatus including controller 124 includes a gaseous reductant conversion module 202, a solid storage media output module 204, and a reductant leak detection module 206. The gaseous reductant conversion module 202 provides expected gaseous reductant conversion values based on the particular solid storage media formulation 208 for the solid storage media stored in reductant source 108. The reductant conversion values may be determined by any method understood in the art. Non-limiting examples include measuring or modeling a $NH_3$ gaseous pressure expected in supply line 121 based on a target operating temperature(s) of the selected solid storage media for converting $NH_3$ into gas from the solid storage media and various consumption rates of the $NH_3$ gas. In another example, the expected pressure is a range of pressures that are expected over a variety of operating conditions, including any one or combination of a range of operating temperatures for the solid storage media, the speed of engine 102, the load on engine 102, and the mass air flow through system 100.

These values for the expected pressure(s) of the gaseous reductant released from reductant source 108, such as $NH_3$ gas, can be created as a dynamic model or algorithm for each type of available solid storage media and stored in memory of controller 124 as experimental or theoretical mapping data or a look-up table for reference during engine operation. The gaseous reductant conversion module 202 may receive solid storage media formulation 208 as an input during the OEM assembly process, a datalink or network communication, and/or may read the solid media storage formulation 208 as a parameter stored on a computer readable medium.

The solid storage media output module 204 determines a coolant temperature input 210, a coolant flow rate input 212, and a solid storage media temperature input 214 and provides an expected gaseous reductant pressure 216 based on these indicators and the data maps or look-up tables stored in gaseous reductant conversion module 202. In another embodiment, coolant temperature input 210 and coolant flow rate input 212 are used to determine an amount of energy supplied to reductant source 108, which energy is used to release or liberate the reductant from the solid storage media. The liberation of reductant from the solid storage media is a known endothermic chemical reaction, and the expected gaseous reductant pressure 216 can be determined from these coolant temperature and flow rate inputs.

The solid storage media output module 204 may determine the solid storage media temperature input 210 from temperature sensor 122 embedded in the solid storage media of reductant source 108. Temperature sensor 122 may be a thermocouple, thermistor, or any other suitable device or combination of devices for determining the current operating temperature of the solid storage media. In one embodiment, temperature sensor 122 comprises multiple temperature sensors at various locations in the solid storage media which are averaged, weighted or are otherwise employed to provide an accurate indication of the average temperature of the entirety of the material comprising the solid storage media. This temperature may be conveyed from the temperature sensor 122 as a temperature value, a voltage which may be converted to a temperature value, and/or a digital signal which can be read by a processor or processor subsystem and is correlated to a solid storage media temperature value.

The solid storage media output module 204 may determine the reductant flow rate input 220 by measurements from metering device 106. The flow rate input 220 of the reductant gas can be communicated to solid storage media output status module 204 as a quantity, rate or other signal which can be read by a processor or processor subsystem and is correlated to a consumption rate of the reductant gas in the exhaust system. Furthermore, the expected gaseous reductant pressure 216 in supply line 121 can be adjusted to compensate for the consumption rate of the reductant gas. For example, at lower consumption rates, the expected gaseous reductant pressure 216 in supply line 121 can be increased to accommodate for lesser utilization of reductant gas in $NO_x$ conversion. At higher consumption rates, the expected gaseous reductant pressure 216 in supply line 121 can be decreased to accommodate for greater utilization of reductant gas in $NO_x$ conversion.

The reductant leak detection module 206 may determine the gaseous reductant pressure input 222 from pressure sensor 118, or pressure sensors 118a, 118b, in fluid communication with the reductant gas in supply line 121. The reductant pressure input 222 may be determined from one or more pressure sensors, such as a single pressure transducer, multiple pressure transducers, a single electromechanical pressure sensor, two inductive pressure sensors or any other combination of pressure sensor(s) that can be configured to determine a pressure in supply line 121. This pressure may be conveyed from the pressure sensor(s) as a pressure value, a voltage which may be converted to a pressure value, and/or a digital signal which can be read by a processor or processor subsystem and is correlated to a pressure value.

The reductant leak detection module 206 may determine the reductant flow switch setting 218 from flow switch 128 in reductant supply line 121. The flow switch 128 is located in supply line 121 directly downstream of reductant source 108 and upstream of metering device 106. Flow switch 218 is set to indicate reductant flow through supply line 121 at the outlet of reductant source 108 exceeding the maximum reductant flow rate command 232, which is provided to control the rate of gaseous reductant flow through metering device 106. The reductant flow rate command 232 is determined by controller 124 to provide a predetermined flow rate of reductant through meter 106 so that the reductant concentration at NOx conversion catalyst 104 provides a desired NOx conversion efficiency to satisfy NOx output limits from NOx conversion catalyst 104. The determination of reductant flow command to satisfy NOx conversion efficiency targets is understood in the art, and any suitable method for determining reductant flow rate command 232 is contemplated.

In one embodiment, the reductant leak detection module 206 compares the expected gaseous reductant pressure 216 in supply line 121, determined from solid storage media output module 204, to a current gaseous reductant pressure input 222. If a substantial deviation is detected that exceeds reductant pressure differential threshold 224, then leakage of reductant gas between reductant source 108 and metering device 106 is indicated. In some embodiments, a temperature drop of the solid storage media can further indicate gaseous reductant leakage. Controller 124 provides reductant leakage indication 228 to an onboard diagnostics system of the vehicle to signal that a service condition exists.

In another embodiment, the reductant leak detection module 206 compares the reductant flow rate input 220 from metering device 106 that satisfies the reductant flow rate command 232 to the reductant flow switch setting 218. If the reductant flow rate at switch 228 exceeds the reductant flow rate input 220 by more than a threshold amount, leakage of reductant gas between reductant source 108 and meter 106 is indicated. Controller 124 provides reductant leakage indication 228 to an onboard diagnostics system of the vehicle to signal that a service condition exists.

In yet another embodiment, controller 124 is configured to simultaneously monitor reductant pressure differential threshold 224 and reductant flow rate differential threshold 226 to determine if a leakage condition is present between reductant source 108 and metering device 106. In still another embodiment, controller 124 is configured to detect leakage of reductant gas between metering device 106 and exhaust flow path 116, as discussed further below. Controller 124 can be configured to detect reductant leak detection downstream of metering device 106 and can be performed in conjunction with one or both of the embodiments for detecting reductant leakage upstream of metering device 106 discussed above.

Reductant leak detection module 206 is further configured to output a leak mitigation command 230 when a reductant leak condition is detected. In one embodiment, leak mitigation command 230 can be provided to shut-off valve 126 to stop the flow of gaseous reductant at the outlet of reductant source 108. In another embodiment, leak mitigation command can be provided to a control valve that stops or limits the flow of coolant to reductant source 108 from coolant supply line 142, thus terminating the heating of the solid storage media and the resulting release of gaseous reductant.

To avoid false positive indications that a reductant leakage condition exists, the reductant pressure differential threshold 224 and reductant flow differential threshold 226 can be established to account for expected operational variations in the precision of the temperature, pressure and flow rate indicators and in variations of the solid storage media formulation. Furthermore, the leak detection module 206 can be configured so that reductant leakage indications are provided during periods where engine and system operating parameters 226 are suitable for such a determination. For example, a predetermined period of continuous operation, a predetermined number or time period of positive leak indications, or other conditions may be required before acceptance of a positive indication that a gaseous reductant leakage condition exists.

Figure 4:
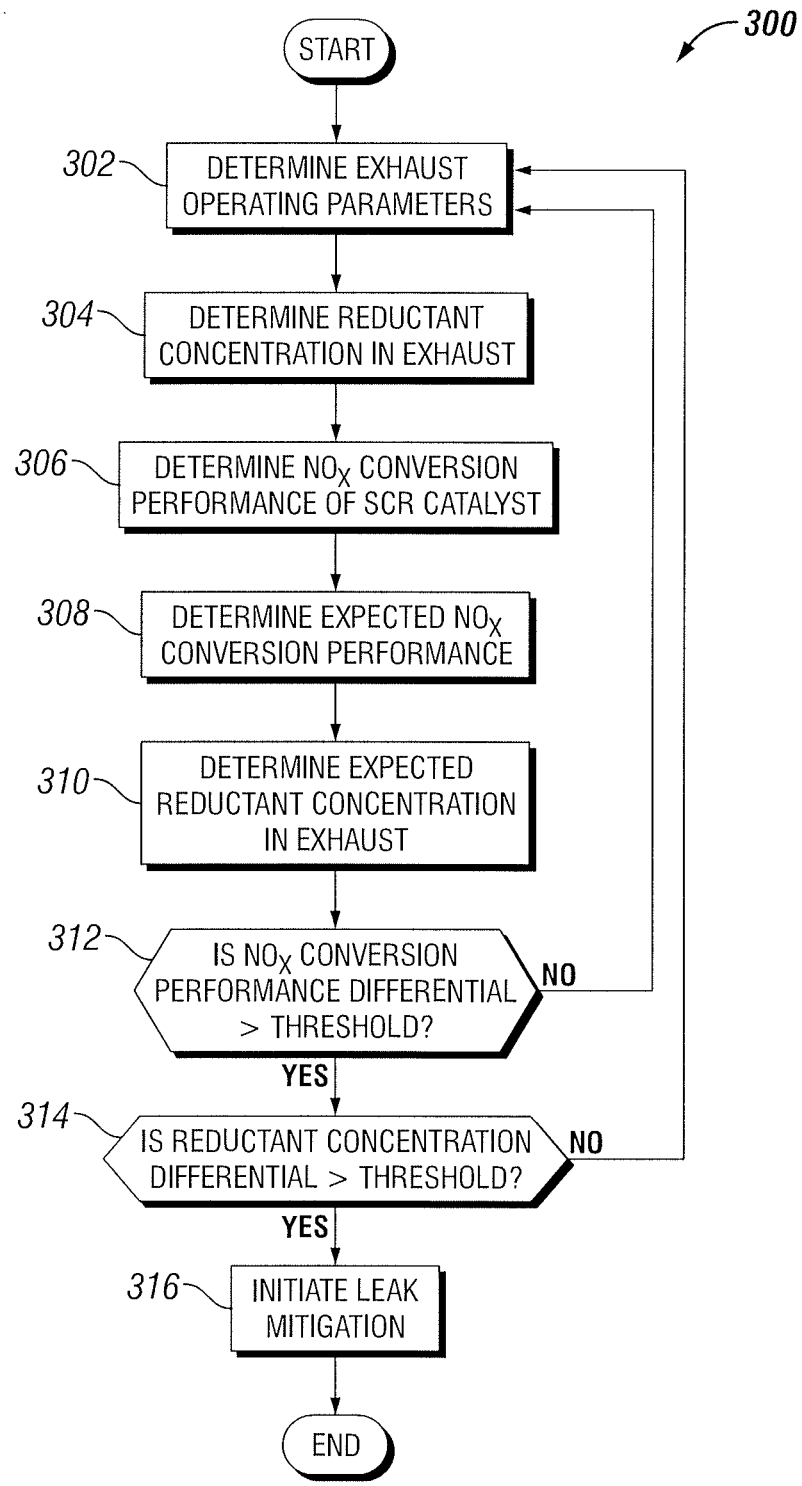
FIG. 4 is a flow diagram of one embodiment leak detection and mitigation procedure for gaseous reductant.
Figure 5:
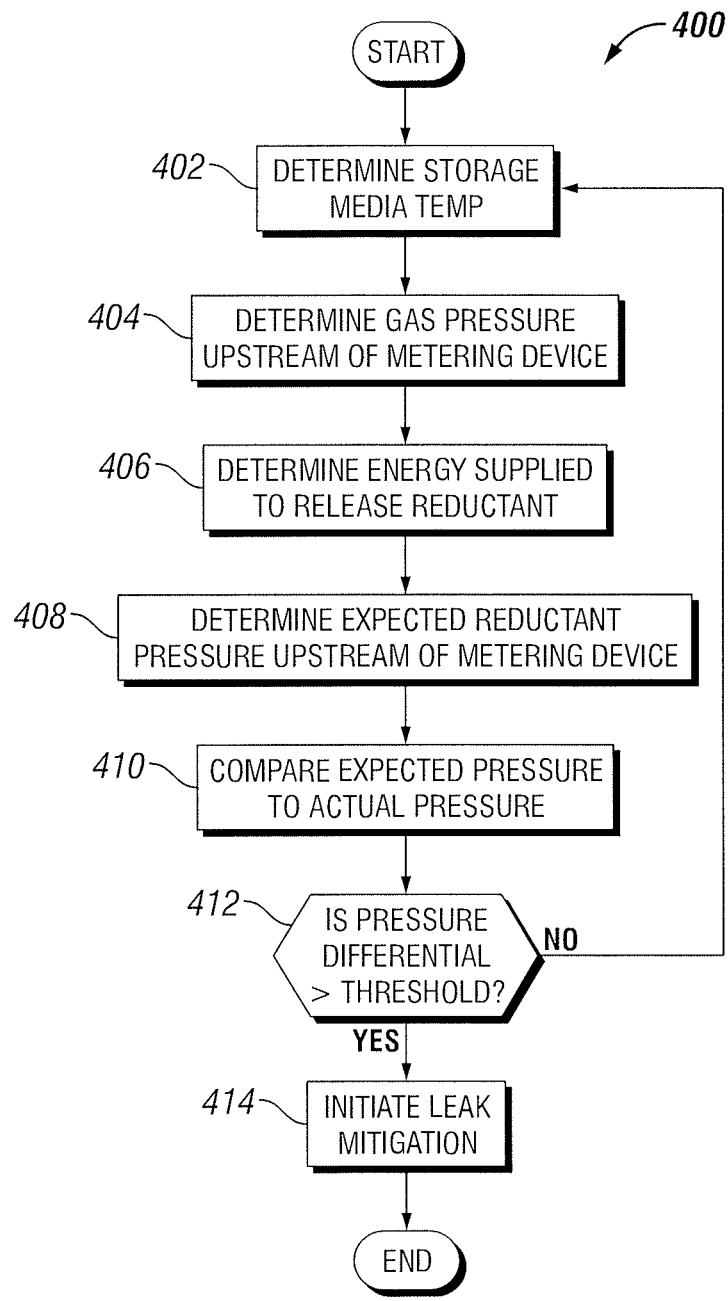
FIG. 5 is a flow diagram of another embodiment leak detection and mitigation procedure for gaseous reductant.
Figure 6:
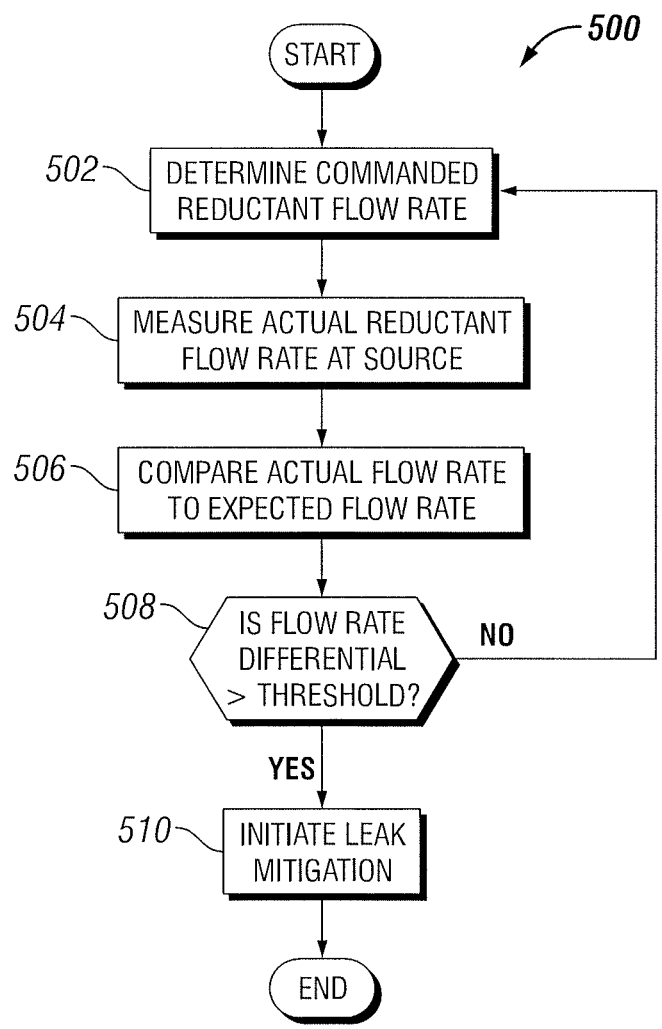
FIG. 6 is a flow diagram of another embodiment leak detection and mitigation procedure for gaseous reductant.

Exemplary procedures for determining a leakage of reductant gas in a delivery system that connects a solid storage media for the reductant to an exhaust flow path are described in FIGS. 4-6. In FIG. 4 a procedure is described for detecting reductant leakage downstream of metering device 106, while in FIGS. 5 and 6 procedures for detecting reductant leakage upstream of metering device 106 are described. Each of the procedures in FIGS. 4-6 include operations for detecting leakage of gaseous reductant from the reductant delivery system in response to actual operating conditions of the gaseous reductant in the delivery system deviating from expected operating conditions of the gaseous reductant in the delivery system by more than a threshold amount.

With reference to FIG. 4, procedure 300 includes an operation 302 to determine operating parameters of the exhaust system. The operating parameters include, for example, the flow rate of exhaust from engine 102, the temperature of the exhaust output from engine 102, and the reductant flow rate command 232. Procedure 300 continues at operation 304 to determine the reductant concentration in the exhaust stream by, for example, an ammonia sensor, a reductant sensor, or by any other sensor from which the reductant concentration can be determined or calculated. Procedure 300 continues at operation 306 to determine the NOx conversion performance of NOx reduction catalyst 104. The determination of the NOx conversion performance is understood by one of ordinary skill in the art, and any suitable method for measuring or determining the NOx conversion performance of NOx reduction catalyst 104 is contemplated.

Procedure 300 continues at operation 308 to determine the expected NOx conversion performance of NOx reduction catalyst 104 and at operation 310 to determine the expected reductant concentration in the exhaust. The expected NOx conversion performance and expected reductant concentration in the exhaust can be determined based on expected NOx conversion values of the NOx reduction catalyst 104 in response to the exhaust operating parameters, the condition of NOx catalyst 104, and the reductant amount commanded to be supplied to the exhaust system in response to the reductant flow command 232.

Procedure 300 continues at conditional 312 and determines if the actual NOx conversion performance in the exhaust system differs from the expected NOx conversion performance in the exhaust system by more than a threshold amount. If conditional 312 is negative, procedure 300 returns to operation 302 to continue to monitor for reductant leakage downstream of meter 106. If conditional 312 is positive, procedure 300 continues at conditional 314 to determine if the reductant concentration in the exhaust system differs from the expected reductant concentration by more than a threshold amount. If conditional 314 is negative, then the differential in NOx conversion performance determined at conditional 312 is due to other causes, and procedure 300 returns to operation 302 to continue to monitor for reductant leakage downstream of metering device 106. If conditional 314 is positive, then the commanded flow rate of reductant is not reaching the exhaust stream, and a reductant leakage condition downstream of metering device 106 is indicated. Procedure 300 continues at operation 316 to initiate leak mitigation measures, such as those discussed above. A leakage indication can also be output to an on-board diagnostic device or output device, such as a warning lamp or other indicator.

With reference to FIG. 5, procedure 400 is disclosed for determining reductant leakage upstream of metering device 106. Procedure 400 includes an operation 402 to determine storage media temperature of the solid storage media in reductant source 108. Procedure 400 further includes an operation 404 to determine the pressure of the gaseous reductant upstream of metering device 106. Procedure 400 further includes an operation 406 to determine the energy supplied from the engine cooling system to release the gaseous reductant from reductant source 108. In response to the determination of the energy supplied to release the gaseous reductant, procedure 400 includes an operation 408 to determine the expected reductant pressure upstream of metering device 106 based on the known endothermic properties of the solid storage media. Procedure 400 continues at operation 410 and compares the expected gaseous reductant pressure to the actual gaseous reductant pressure upstream of metering device 106. At conditional 412, the pressure differential between the expected gaseous reductant pressure and the actual gaseous reductant pressure is compared to a predetermined threshold. If the pressure differential is less than the threshold, procedure 400 returns to operation 402 to monitor reductant leakage upstream of metering device 106. If conditional 412 is positive, procedure 400 continues at operation 414 to initiate leak mitigation measures, such as those discussed above. A leakage indication can also be output to an on-board diagnostic device and/or output device, such as a warning lamp or other indicator.

With reference to FIG. 6, procedure 500 is disclosed for determining reductant leakage upstream of metering device 106. Procedure 500 includes an operation 502 to determine the reductant flow rate of gaseous reductant from reductant source 108. In one embodiment, the reductant flow rate is determined at the metering device 106, and metering device 106 is configured to provide a reductant flow rate therethrough that corresponds to a commanded reductant flow rate for NOx emissions reduction. Procedure 500 further includes an operation 504 to measure the actual reductant flow rate outlet from reductant source 108, such as by flow switch 128, upstream of metering device 106. Procedure 500 continues at operation 506 and compares the commanded gaseous reductant flow rate measured by metering device 106, to the flow rate measured at the outlet of reductant source 108. At conditional 508, the flow rate differential between the flow rate of gaseous reductant through metering device 106 and the reductant flow rate at the outlet of reductant source 108 is compared to a predetermined threshold. If the flow rate differential is less than the threshold, procedure 500 returns to operation 502 to monitor reductant leakage upstream of metering device 106. If conditional 508 is positive, procedure 500 continues at operation 510 to initiate leak mitigation measures, such as those discussed above. A leakage indication can also be output to an on-board diagnostic device and/or output device, such as a warning lamp or other indicator.

The schematic flow diagrams and related descriptions above provide illustrative embodiments of performing procedures for gaseous reductant leak detection in a reductant delivery system. Operations illustrated are understood to be exemplary only, and operations may be combined or divided, and added or removed, as well as re-ordered in whole or part, unless stated explicitly to the contrary herein. The operations of the various embodiments can also be combined as a single embodiment. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

As is evident from the figures and text presented above, a variety of embodiments according to the present disclosure are contemplated.

While the invention has been illustrated and described in detail in the drawings and foregoing description, the same is to be considered as illustrative and not restrictive in character, it being understood that only certain exemplary embodiments have been shown and described. Those skilled in the art will appreciate that many modifications are possible in the example embodiments without materially departing from this invention. Accordingly, all such modifications are intended to be included within the scope of this disclosure as defined in the following claims.

In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A method, comprising:
   releasing a gaseous reductant from a solid storage media of a reductant source connected by a reductant delivery system to an exhaust flow path; and
   detecting, with a controller, a leakage of the gaseous reductant from the reductant delivery system between the solid storage media and the exhaust flow oath by determining a differential between actual operating conditions of the gaseous reductant in the reductant delivery system and expected operating conditions of the gaseous reductant in the reductant delivery system being more than a threshold amount.

2. The method of claim 1, wherein detecting leakage includes:
   determining an actual pressure of the gaseous reductant in the reductant delivery system;
   determining an expected pressure of the gaseous reductant in the reductant delivery system; and
   indicating a leakage condition when a differential between the actual pressure and the expected pressure is more than the threshold amount.

3. The method of claim 2, wherein the actual pressure is measured at a metering device of the reductant delivery system that is downstream of the reductant source.

4. The method of claim 2, wherein determining the expected pressure of the gaseous reductant includes determining the expected pressure from an amount of energy supplied to the solid storage media.

5. The method of claim 4, wherein determining the amount of energy includes determining a temperature and a flow rate of an engine coolant supplied to the solid storage media for heating of the solid storage media to release the reductant in a gaseous form to the reductant delivery system.

6. The method of claim 1, wherein detecting leakage includes:
   determining a flow rate of the gaseous reductant through a metering device of the reductant delivery system;
   measuring an actual flow rate of the gaseous reductant upstream of the metering device at an outlet of the reductant source into the reductant delivery system; and
   indicating a leakage condition when the actual flow rate at the outlet of the solid storage media exceeds the flow rate through the metering device by more than the threshold amount.

7. The method of claim 6, wherein the actual flow rate is measured by a flow switch at the outlet of the reductant source.

8. The method of claim 1, wherein detecting leakage of the gaseous reductant from the reductant delivery system includes:
   determining an expected NOx conversion efficiency of a NOx reduction catalyst in the exhaust flow path and an expected reductant concentration in an exhaust gas in the exhaust flow path;
   determining an actual NOx conversion efficiency of the NOx reduction catalyst in the exhaust flow path and an actual reductant concentration in the exhaust gas in the exhaust flow path; and
   indicating a leakage condition in response to the actual NOx conversion efficiency deviating from the expected NOx conversion efficiency by more than a first threshold amount and the actual reductant concentration deviating from the expected reductant concentration by more than a second threshold amount.

9. The method of claim 1, wherein releasing the gaseous reductant includes heating the solid storage media with a coolant heated by operation of an internal combustion engine connected to the exhaust flow path.

10. The method of claim 1, wherein the reductant delivery system includes a supply line connecting an outlet of the reductant source to the exhaust flow path, the reductant delivery system further including a metering device between the reductant source and the exhaust flow path and a shut-off valve at the outlet of the reductant source.

11. The method of claim 1, further comprising mitigating leakage of the gaseous reductant in response to detecting leakage of the gaseous reductant.

12. The method of claim 11, wherein mitigating leakage includes closing a shut-off valve at an outlet of the reductant source.

13. The method of claim 11, wherein mitigating leakage include terminating heating of the solid storage media in the reductant source.

14. A system, comprising:
   an internal combustion engine producing an exhaust stream, the exhaust stream including an amount of NOx emitted into an exhaust flow path;
   a NOx conversion catalyst in the exhaust flow path that reduces at least a portion of the amount of NOx;
   a reductant source that stores a NOx reductant in a solid storage media and a reductant supply line that receives gaseous NOx reductant from the reductant source in response to heating of the solid storage media, wherein the supply line includes a metering device to measure a flow rate of the gaseous reductant and provides the NOx reductant to the exhaust flow path at a position upstream of the NOx conversion catalyst; and
   a controller operably connected to one or more sensors associated with the exhaust stream and the gaseous reductant, wherein the controller is configured to detect leakage of gaseous reductant from a reductant delivery system between the solid story media and the exhaust flow path in response to a differential between actual operating conditions of the gaseous reductant in the delivery system and expected operating conditions of the gaseous reductant in the delivery system being more than a threshold amount.

15. The system of claim 14, wherein the $NO_x$ reductant comprises ammonia and the solid storage media comprises metal ammine salts.

16. The system of claim 14, wherein the exhaust flow path includes a diesel oxidation catalyst and a diesel particulate filter upstream from the $NO_x$ conversion catalyst.

17. An apparatus, comprising:
an electronic controller structured to receive operating parameters from at least one sensor associated with a reductant delivery system connected to an exhaust flow path, including a solid storage media for storing a reductant and releasing the reductant in a gaseous form when heated, wherein the controller includes:
   a solid storage media output module structured to determine at least one of an expected pressure of a gaseous reductant in the reductant delivery system and a flow rate of the gaseous reductant through a metering device of the reductant delivery system;
   a leak detection module structured to determine a differential between at least one of:
      an actual pressure of the gaseous reductant in the reductant delivery system and the expected pressure; and
      a flow rate of gaseous reductant upstream of the metering device and the flow rate through the metering device;
   wherein the leak detection module is further structured to provide a gaseous reductant leak indication when the differential exceeds a threshold amount.

18. The apparatus of claim 17, wherein the leak detection module is further structured to:
   determine an expected NOx conversion efficiency of a NOx reduction catalyst in the exhaust flow path and an expected reductant concentration in an exhaust gas in the exhaust flow path;
   determine an actual NOx conversion efficiency of the NOx reduction catalyst in the exhaust flow path and an actual reductant concentration in the exhaust gas in the exhaust flow path; and
   provide the gaseous reductant leak indication in response to the actual NOx conversion efficiency deviating from the expected NOx conversion efficiency more than a first threshold amount and the actual reductant concentration deviating from the expected reductant concentration by more than a second threshold amount.

19. The apparatus of claim 17, wherein the leak detection module is configured to output a mitigation command in response to the gaseous reductant leak indication.

20. The apparatus of claim 19, wherein the mitigation command includes at least one of closing a shut-off valve at an outlet of a reductant source of the reductant delivery system and terminating heating of the reductant source.

* * * * *